(12) United States Patent
Davis et al.

(10) Patent No.: US 9,228,309 B1
(45) Date of Patent: Jan. 5, 2016

(54) PORTABLE DAM ASSEMBLIES

(71) Applicant: TETRA TECHNOLOGIES, INC., The Woodlands, TX (US)

(72) Inventors: Robert Davis, Bellefonte, PA (US); Mark Ritchey, State College, PA (US)

(73) Assignee: TETRA Technologies, Inc., The Woodlands, TX (US)

( * ) Notice: Subject to any disclaimer, the term of this patent is extended or adjusted under 35 U.S.C. 154(b) by 0 days.

(21) Appl. No.: 14/172,098

(22) Filed: Feb. 4, 2014

Related U.S. Application Data

(63) Continuation of application No. 13/480,469, filed on May 24, 2012, now Pat. No. 8,640,901.

(60) Provisional application No. 61/651,546, filed on May 24, 2012, provisional application No. 61/489,336, filed on May 24, 2011.

(51) Int. Cl.
| | |
|---|---|
| *E02B 3/10* | (2006.01) |
| *B65D 88/16* | (2006.01) |
| *B65D 88/52* | (2006.01) |
| *B65D 90/02* | (2006.01) |
| *B65D 90/04* | (2006.01) |

(52) U.S. Cl.
CPC .............. *E02B 3/10* (2013.01); *B65D 88/1656* (2013.01); *B65D 88/528* (2013.01); *B65D 90/023* (2013.01); *B65D 90/047* (2013.01); *E02B 3/106* (2013.01)

(58) Field of Classification Search
CPC ...... B65D 88/12; B65D 88/02; B65D 88/123; B65D 90/047; B65D 90/046; B65D 90/04; B65D 88/1656; B65D 88/528; B65D 90/023; B65D 88/1612; B65D 88/526; B65D 88/52; B65D 90/024; E02B 3/106; E02B 3/10
USPC .............. 220/565, 567, 567.1, 615, 610, 638, 220/628, 1.6, 9.4
IPC ................................. B65D 90/04, 25/16, 25/14
See application file for complete search history.

(56) References Cited

U.S. PATENT DOCUMENTS

| | | |
|---|---|---|
| 414,913 A | 11/1889 | Lommer |
| 2,380,089 A | 7/1945 | Ulm |
| 2,593,153 A | 4/1952 | Jorr, Jr. |

(Continued)

FOREIGN PATENT DOCUMENTS

| | | | |
|---|---|---|---|
| CA | 2379559 A1 * | 12/2000 | .............. E02B 3/106 |
| DE | 843829 | 7/1952 | |

(Continued)

OTHER PUBLICATIONS

Portadam, Inc. Newspaper Advertisement, Nov. 13, 1995.

*Primary Examiner* — Robert J Hicks
(74) *Attorney, Agent, or Firm* — Brett A. North; Garvey, Smith, Nehrbass & North, LLC

(57) ABSTRACT

A water containment apparatus includes a straight strut arrangement comprising a plurality of straight strut assemblies forming an alternating v-shape and inverted v-shape pattern; and a curved strut arrangement comprising a plurality of corner strut assemblies forming a desired curvature and connecting two straight strut arrangements to form a closed loop water containment system.

11 Claims, 11 Drawing Sheets

(56) References Cited

U.S. PATENT DOCUMENTS

| | | |
|---|---|---|
| 3,735,427 A | 5/1973 | Ancewicz et al. |
| 4,136,995 A | 1/1979 | Fish |
| 4,356,933 A | 11/1982 | Connolly |
| 4,473,978 A | 10/1984 | Wood |
| 4,511,286 A | 4/1985 | Hardacre |
| 4,648,752 A | 3/1987 | Guy et al. |
| 4,921,373 A * | 5/1990 | Coffey .................. 405/115 |
| 5,454,195 A | 10/1995 | Hallsten |
| 5,470,177 A | 11/1995 | Hughes |
| 6,079,904 A | 6/2000 | Trisl |
| 6,132,140 A | 10/2000 | Kullberg |
| 6,676,333 B2 | 1/2004 | Wiseman et al. |
| 7,574,834 B2 | 8/2009 | Murray |
| 2003/0156903 A1 * | 8/2003 | Wiseman et al. .............. 405/115 |
| 2004/0188446 A1 | 9/2004 | Gulati et al. |
| 2012/0261414 A1 | 10/2012 | Mann et al. |

FOREIGN PATENT DOCUMENTS

| | | | |
|---|---|---|---|
| DE | 19518791 A1 * | 11/1996 | .............. E02B 3/106 |
| DE | 10150902 A1 * | 1/2003 | .............. E02B 3/106 |
| DE | 10237068 A1 * | 2/2004 | .............. E02B 3/106 |
| GB | 2420366 | 5/2006 | |
| LU | 88825 A1 * | 7/1997 | .............. E02B 3/106 |

* cited by examiner

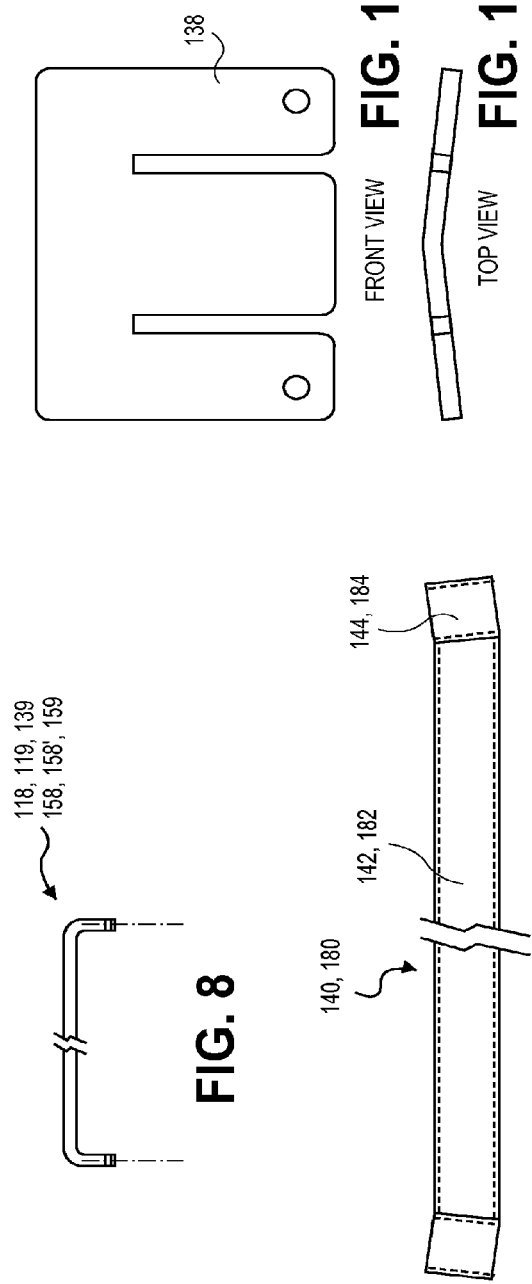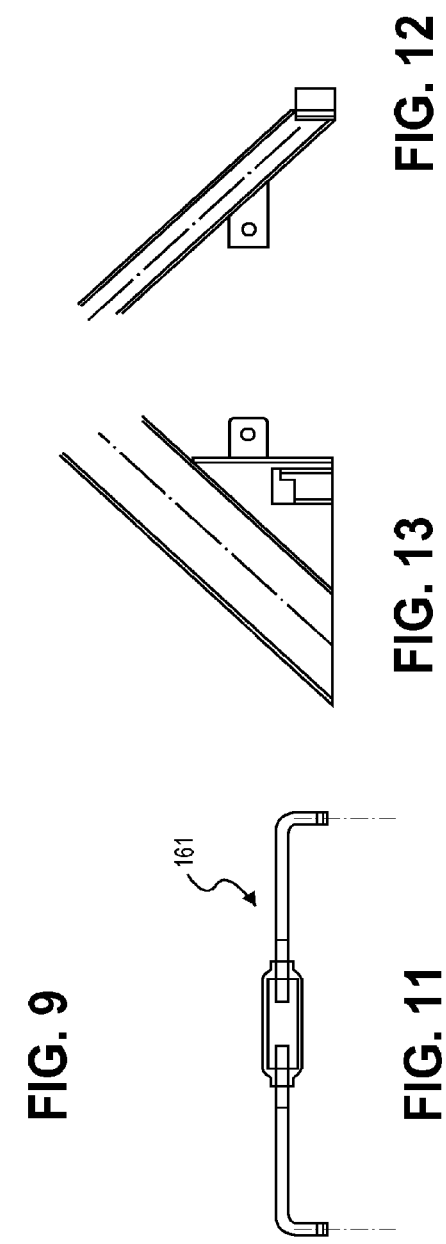

TOP VIEW

SIDE VIEW

PORTABLE DAM ASSEMBLIES

CROSS-REFERENCE TO RELATED APPLICATIONS

This is a continuation of U.S. patent application Ser. No. 13/480,469, filed on May 24, 2012 (issuing as U.S. Pat. No. 8,640,901 on Feb. 4, 2014), which application was a Non-Provisional of U.S. Provisional Patent Application Ser. No. 61/489,336, filed on May 24, 2011, and U.S. Provisional Patent Application No. 61/651,546, filed on May 24, 2012. Each of the above referenced patent applications are incorporated herein by reference.

STATEMENT REGARDING FEDERALLY SPONSORED RESEARCH OR DEVELOPMENT

Not applicable

REFERENCE TO A "MICROFICHE APPENDIX"

Not applicable

BACKGROUND

The present disclosure relates generally to portable dam assemblies and method for assembling same. The present disclosure is broadly concerned with cofferdams for use in temporarily holding back a body of water when performing construction, repairs or bank stabilization in the bed of a river or a lake or any body of water, and also on dry land for flood protection. Such cofferdams are typically constructed of a framework of individual frame structures placed in adjacent alignment along a portion of the body of water which is to be held back. A flexible waterproof fabric is secured along the framework for holding back the water so that work may be performed in the area behind the framework. Given the substantial hydrostatic pressure created in holding back a large volume of water, the frame structures must be extremely sturdy. They are typically formed of steel or iron stock and have a triangular configuration which is best suited for bearing the pressure load. These cofferdams are constructed so that they may be quickly erected and disassembled. Portable dams of this type are well known to those having skill in the art.

Because of the need for quick assembly and disassembly of the portable dam, it is critical that the individual frame structures be configured not only for ease in erecting, but also ease and efficiency in transporting. Frequently, portable dams must be erected as quickly as possible, especially during emergency conditions, so it is important that the individual frame structures be connected in a manner to permit this. Current modes of connection include clamps which must be bolted directly to the frame structures, and stakes which must be driven into the ground as well as bolted to the frame structure. A substantial amount of time is invested in bolting on these clamps. Additionally, because of the large number of individual frame structures required in constructing a length of cofferdam, it is desirable to maximize the number of frame structures that can be stacked on a truck or trailer that transports the frame structures. Generally, individual frame structures are integral pieces and are fixed in their triangular configuration, which is not particularly conducive to efficient stacking. Accordingly, several truck load trips must usually be made to bring a sufficient number of frame structures to the cofferdam construction site.

A further problem faced by erectors of portable cofferdams lies in being able to place the framework down in a stable position in the bed of the body of water to be held back. There is a tremendous pressure placed on the frame structures from the body of water that is held back. Frequently, the river bed is uneven or rocky, which creates stability problems by causing the continuity of the framework to be disrupted. Weak points in the framework caused by such a disruption could allow the cofferdam to collapse, leading to disastrous results.

Accordingly, there is a need in the art for frame structures for use in a portable dam that are adapted for quick assembly and disassembly in erecting the dam with minimal amount of set up time or expenditure of manpower. Additionally, it is desirable that such frame structures be configured for efficient transportation and storage.

Further, there is a need for frame structures of a portable dam that provide stabilization for supporting large hydrostatic pressures and that are adapted to adjust to uneven terrain on which the dam is erected so that stability of the dam can be maintained.

BRIEF DESCRIPTION OF THE DRAWINGS

FIG. 8 shows a coupling member.

FIG. 9 shows a rear coupling member.

FIG. 10A shows a front view of a rear plate member.

FIG. 10B shows a top view of the rear plate member of FIG. 10A.

FIG. 11 shows an adjustable connector member.

FIG. 12 shows the bottom portion of a support member.

FIG. 13 shows the bottom portion of a strut member.

DETAILED DESCRIPTION

Reference will now be made in detail to specific embodiments or features, examples of which are illustrated in the accompanying drawings. Generally, corresponding or similar reference numbers will be used, when possible, throughout the drawings to refer to the same or corresponding parts.

Figure 1:
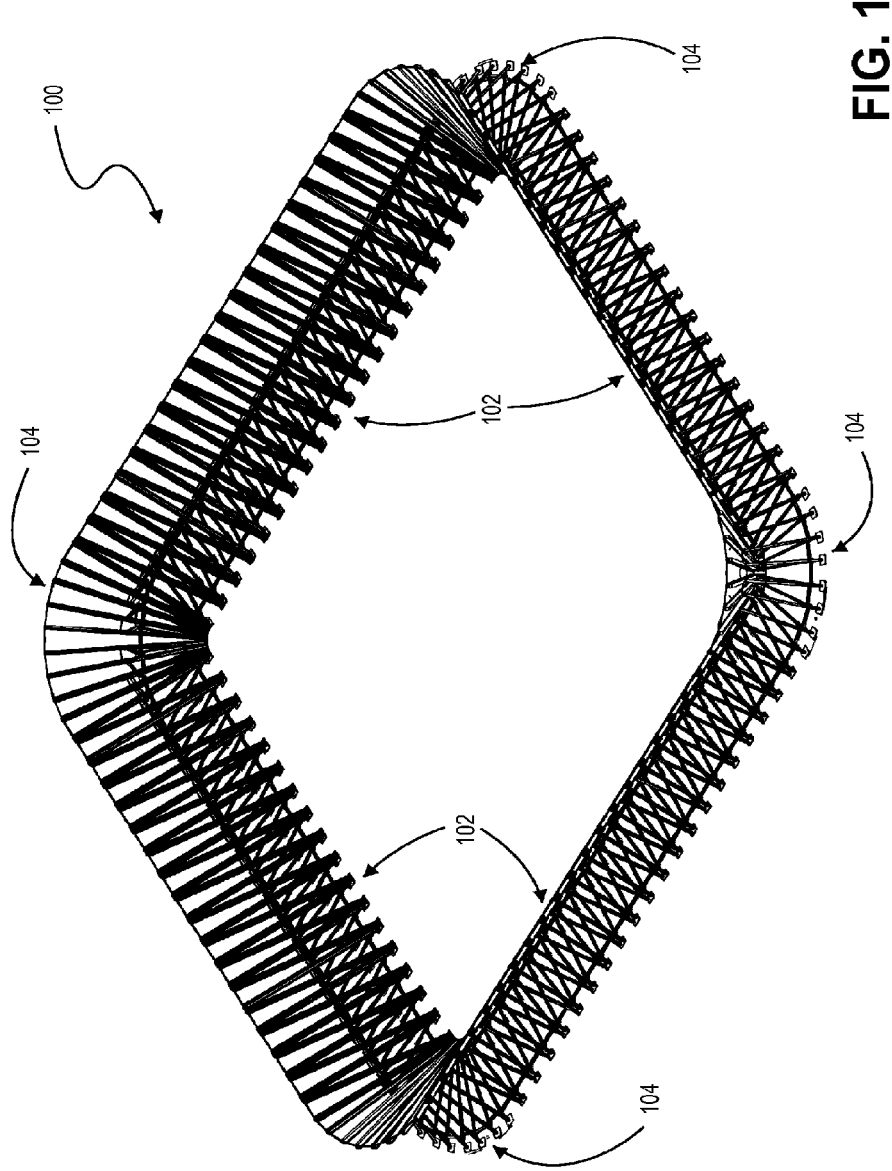
FIG. 1 illustrates an exemplary embodiment of a closed loop containment system in accordance with various aspects of the disclosure.
Figure 7:
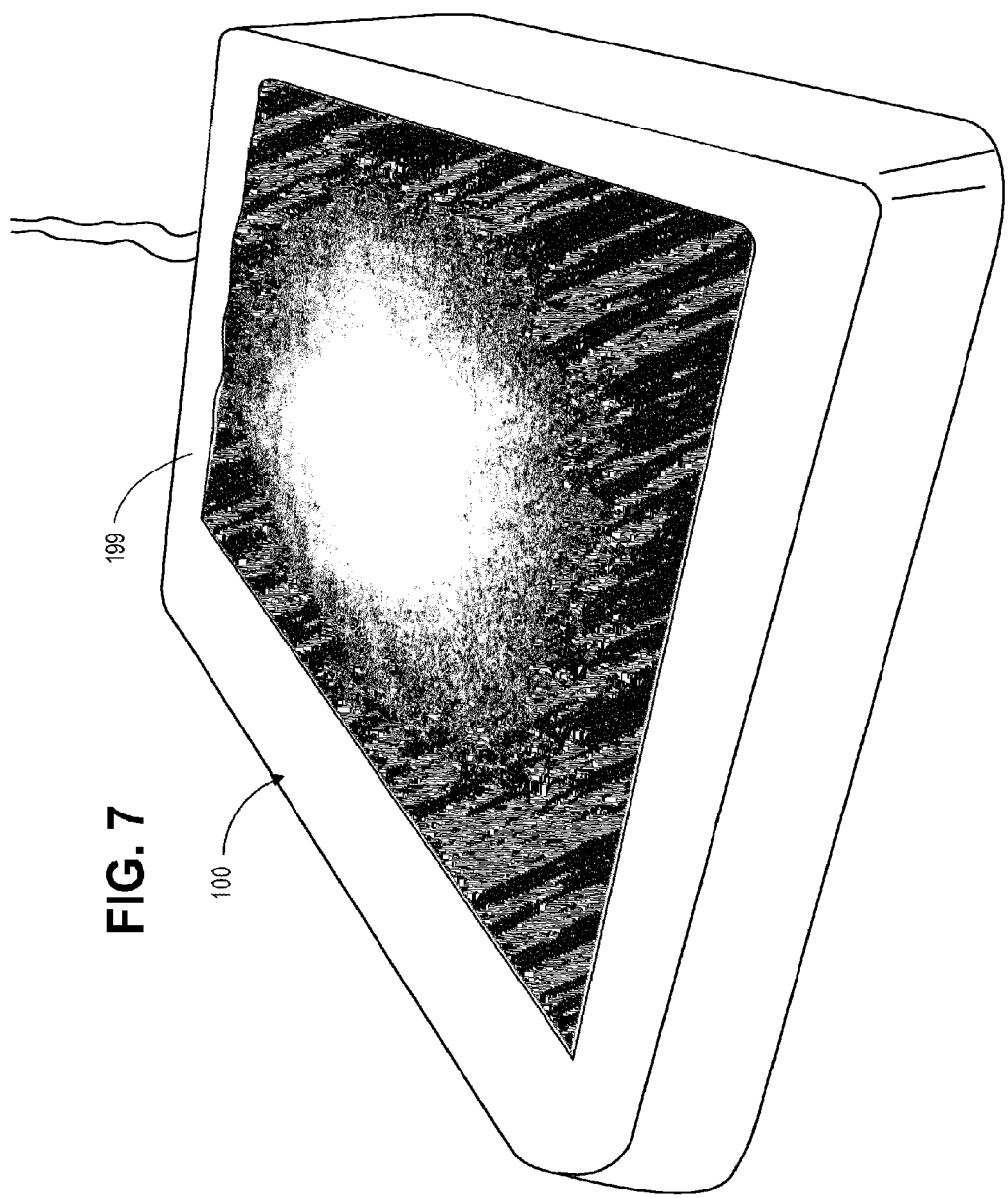
FIG. 7 illustrates an exemplary embodiment of a dam and diversion system in accordance with various aspects of the disclosure.
Figures 14A, 14B:
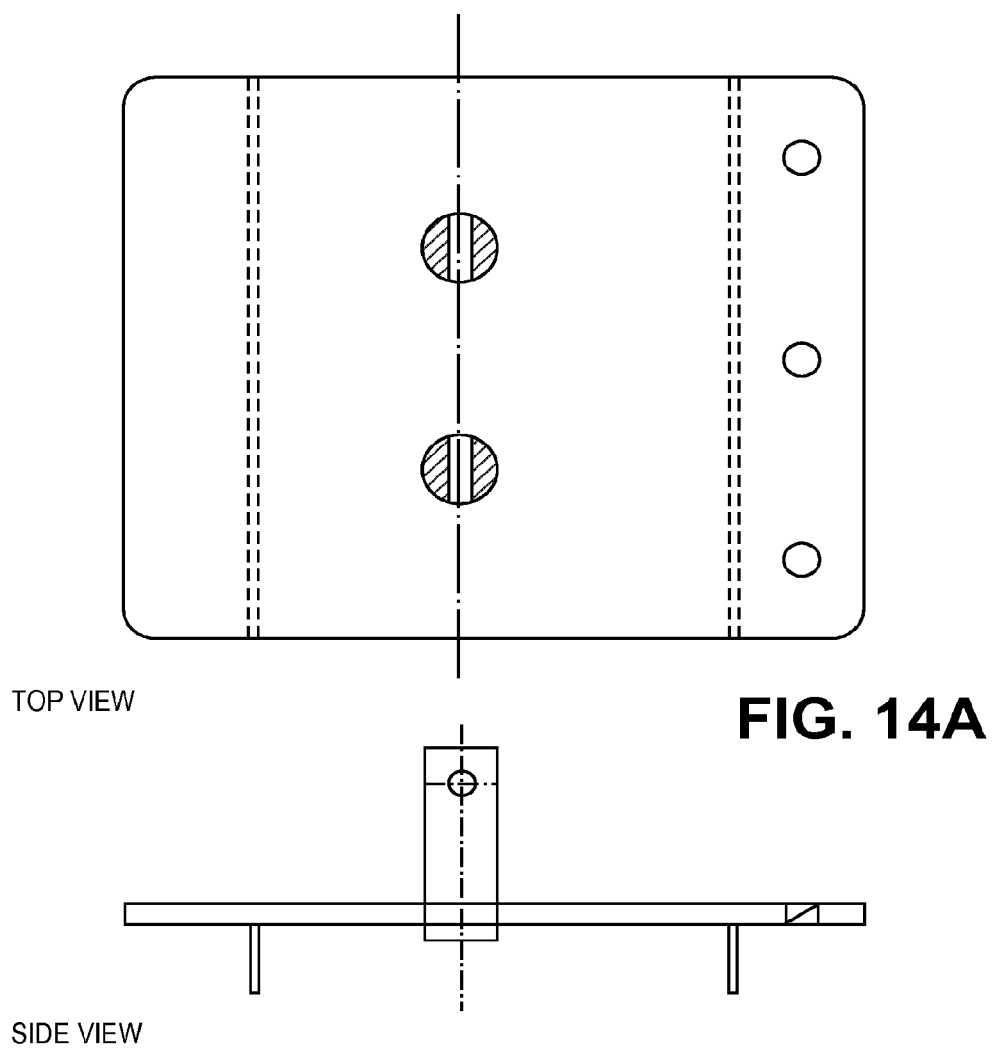
FIG. 14A shows a top view of a base member.
FIG. 14B shows a side view of the base member of FIG. 14A.
Figure 15:
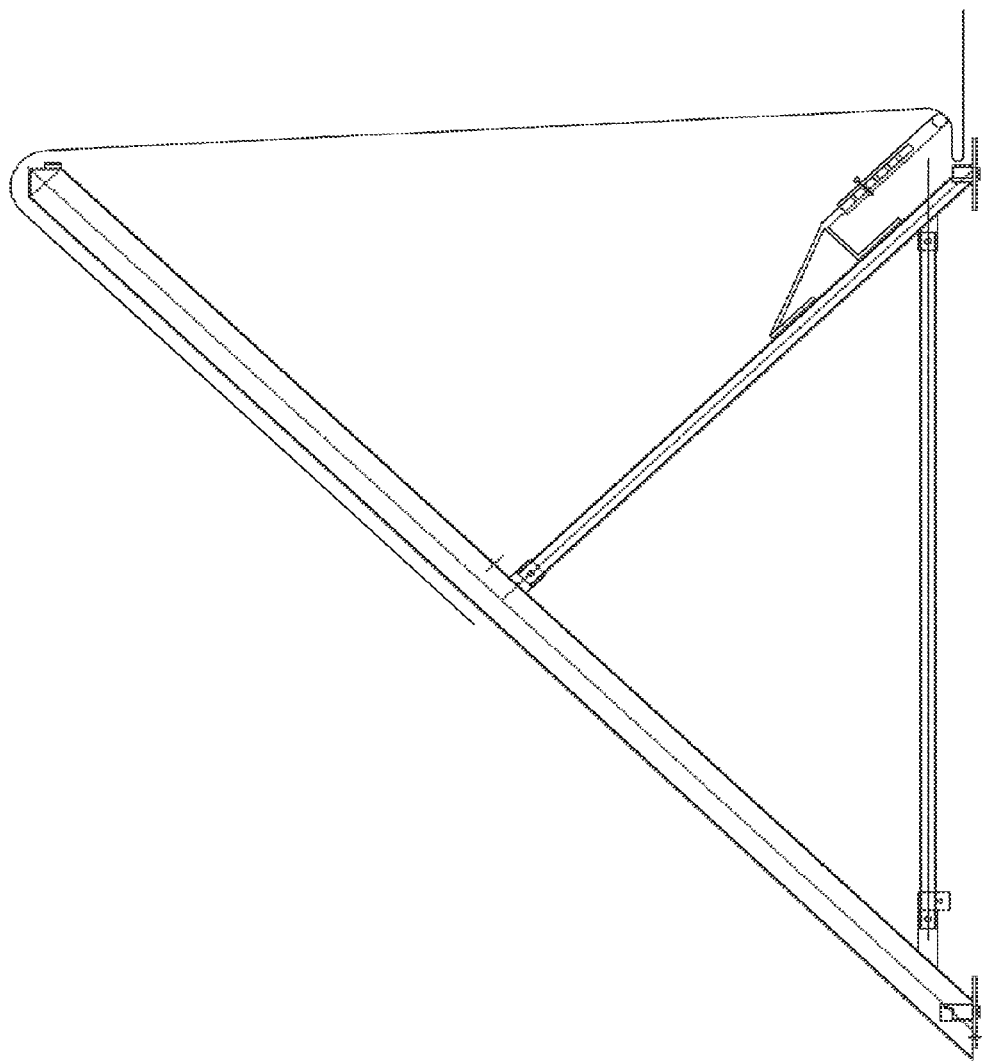
FIG. 15 shows a side view of a strut member with locking system for liner.
Figure 16:
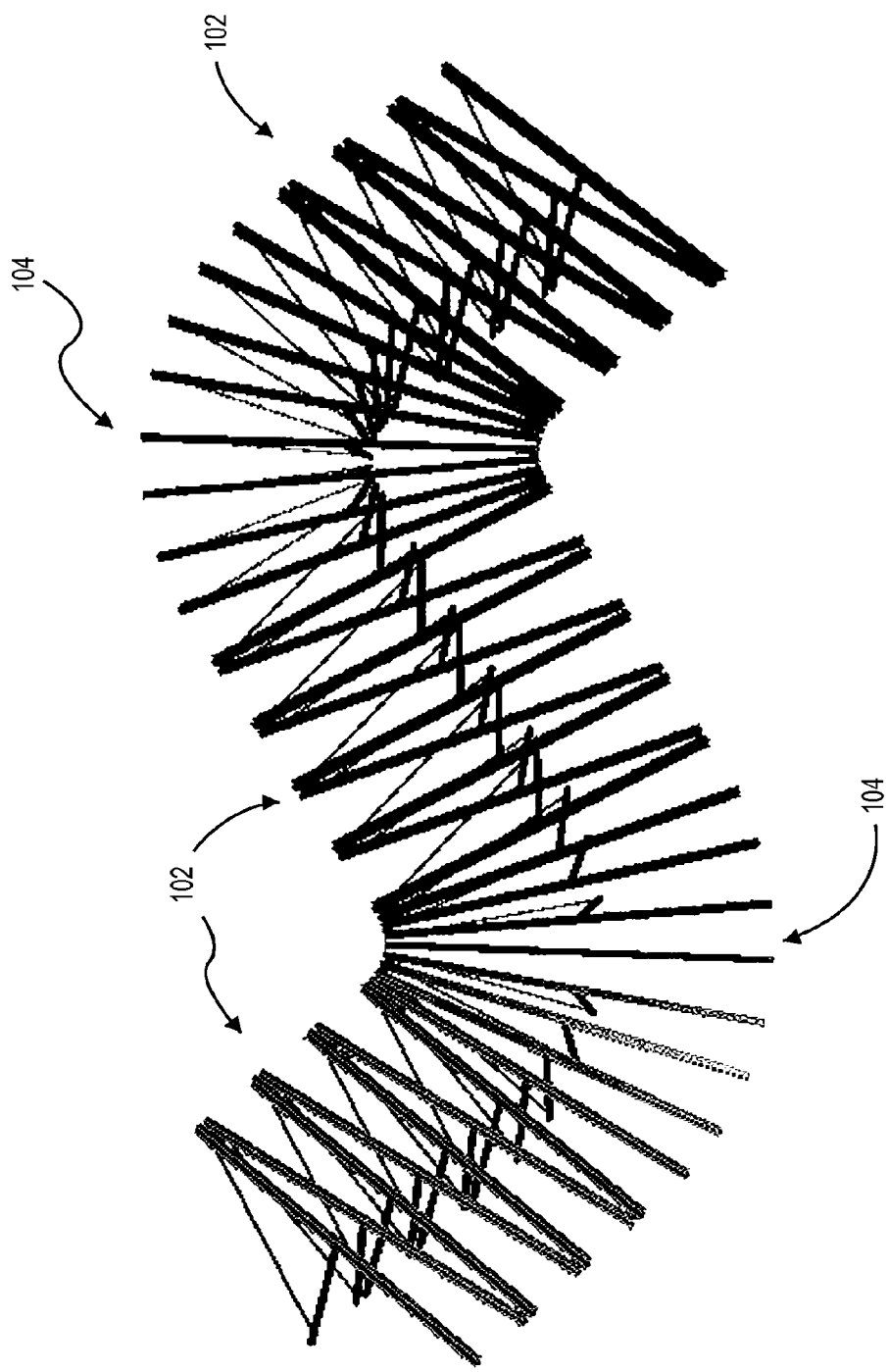
FIG. 16 shows a varied shape system.

Referring now to FIG. 1, a perspective view of an exemplary closed loop containment system 100 in accordance with aspects of the disclosure is illustrated and described. The closed loop containment system 100 may include arrangements 102 of straight strut assemblies 110 and arrangements 104 of corner strut assemblies 150 coupled in a substantially square configuration. It should be appreciated that, in various aspects of the disclosure, the arrangements 102 of straight strut assemblies 110 and the arrangements 104 of corner strut assemblies 150. The corner arrangements can be built in 22.5 degree increments thus allowing for construction of any desired size, shape, and configuration including a combination of straight sides and/or turns in 22.5 degree increments. As shown in FIG. 15, the corners are interchangeable and designed to have 'inside' and 'outside' geometry, thereby permitting construction of different shaped containment systems including square, rectangular, trapezoidal, and "L" and "U" shapes. Thus, systems in accordance with the present disclosure can be used for both closed loop containment, as well as dam and diversion applications. In either case, the system 100 may be lined with a water-impermeable liner 199, as is known by persons of ordinary skill in the art (FIG. 7). For example, the liner 199 may comprise any geogrid, geotextile, and liners and/or combination thereof. Some materials may include, for example, polypropylene, polyethylene, 1DPE, and spray on rubber/plastics.

Figure 2:
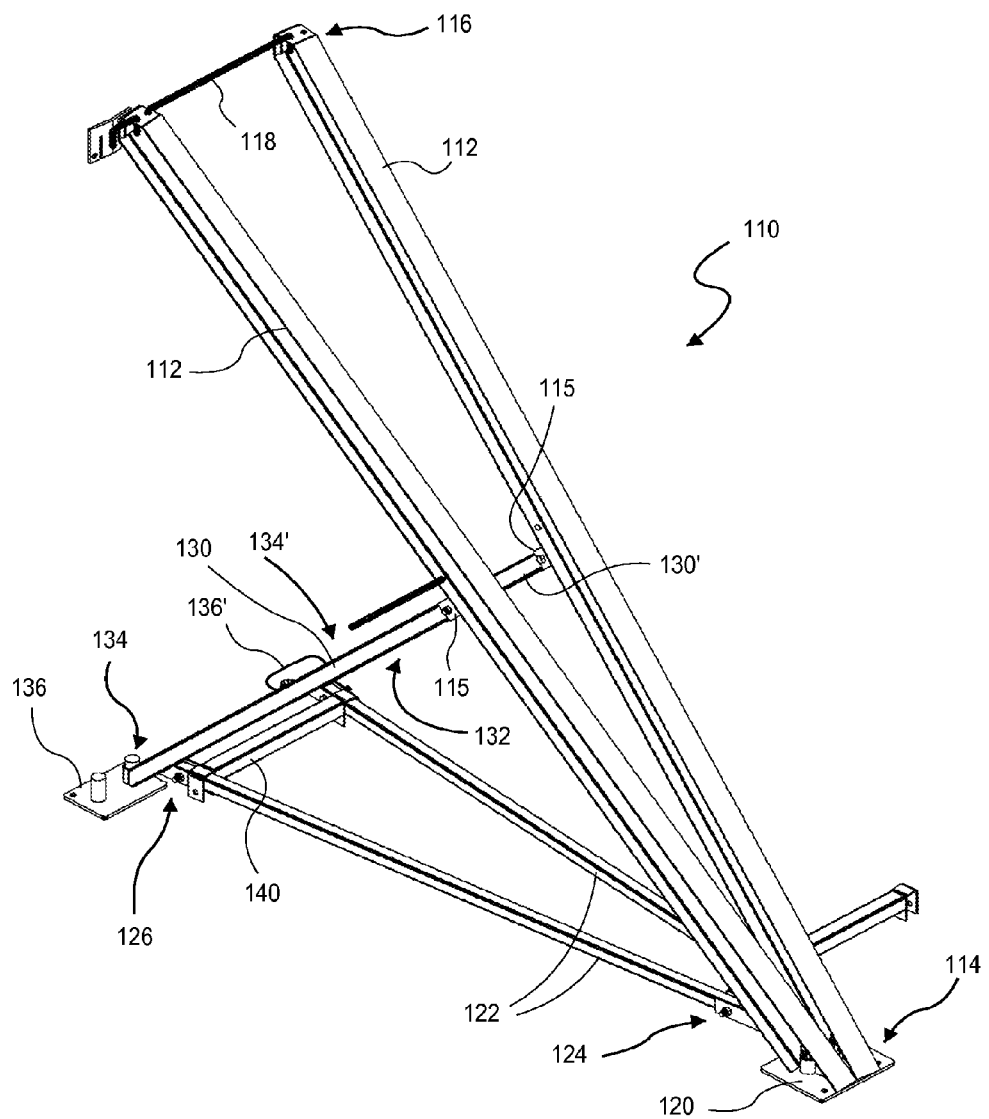
FIG. 2 illustrates an exemplary embodiment of a straight strut assembly in accordance with various aspects of the disclosure.

Referring now to FIG. 2, an exemplary straight strut assembly 110 is illustrated and described. The straight strut assembly 110 may include two strut members 112. According to various aspects, the strut members 112 may be substantially identical beams (i.e., within the parameters of conventional manufacturing tolerances), such as, for example, I-beams. It should be appreciated that the strut members 112, according to various aspects, may be tubes, channels, angles, pipes, or the like. It should further be appreciated that the strut member 112 may be metal (e.g., aluminum), wood, and/or a composite. The strut members 112 each have a first end 114 coupled with a front base plate 120 and extend away from the front base plate 120 in a V-shaped configuration. The strut members 112 each have a second end 116 spaced a distance from one another and coupled with one another via a coupling member 118. According to various aspects, the coupling member 118 may be a drop pin, such as that shown in FIG. 8.

The straight strut assembly 110 may include a pair of base members 122 and a pair of support members 130, 130'. Each base member 122 has a first end 124 pivotally coupled with one of the strut members 112 near the first end 114 thereof. Each support member 130 has a first end 132 pivotally coupled with one of the strut members 112 at a joint 115 intermediate the first and second ends 114, 116. A second end 134 of one of the support members 130 may be coupled with a first rear base plate 136, and a second end 134' of the other support member 130' may be coupled with a second rear base plate 136'.

As shown in FIG. 2, the base members 122 extend from the front base plate 120 in a diverging configuration. Thus, second ends 126 of the base members 122 are spaced from one another substantially the same distance as the second ends 116 of the strut members 112. The second ends 126 of the base members 122 are coupled to the respective support members 134, 134'. The base members 122 are also coupled to one another proximate their second ends 126 by a rear coupling 140. As shown in FIG. 9, the rear coupling 140 may comprise a bar 142 having angled receiving members 144, for example, channels, at each end of the bar 142. The angled receiving members 144 are structured and arranged to receive the second ends 126 of the base members 122 at substantially the same angle at which the base members 122 diverge from one another. As shown in FIG. 2, the angled receiving members 144 may be placed above the base members 122 relative to a ground surface. The angle receiving members 144 may include an optional opening on each side of the base member 122 to receive a coupling member (not shown), such as for example, a pin, a bolt, or the like, to prevent the rear coupling from inadvertently dislodging from the base members 122 during assembly.

Figure 3:
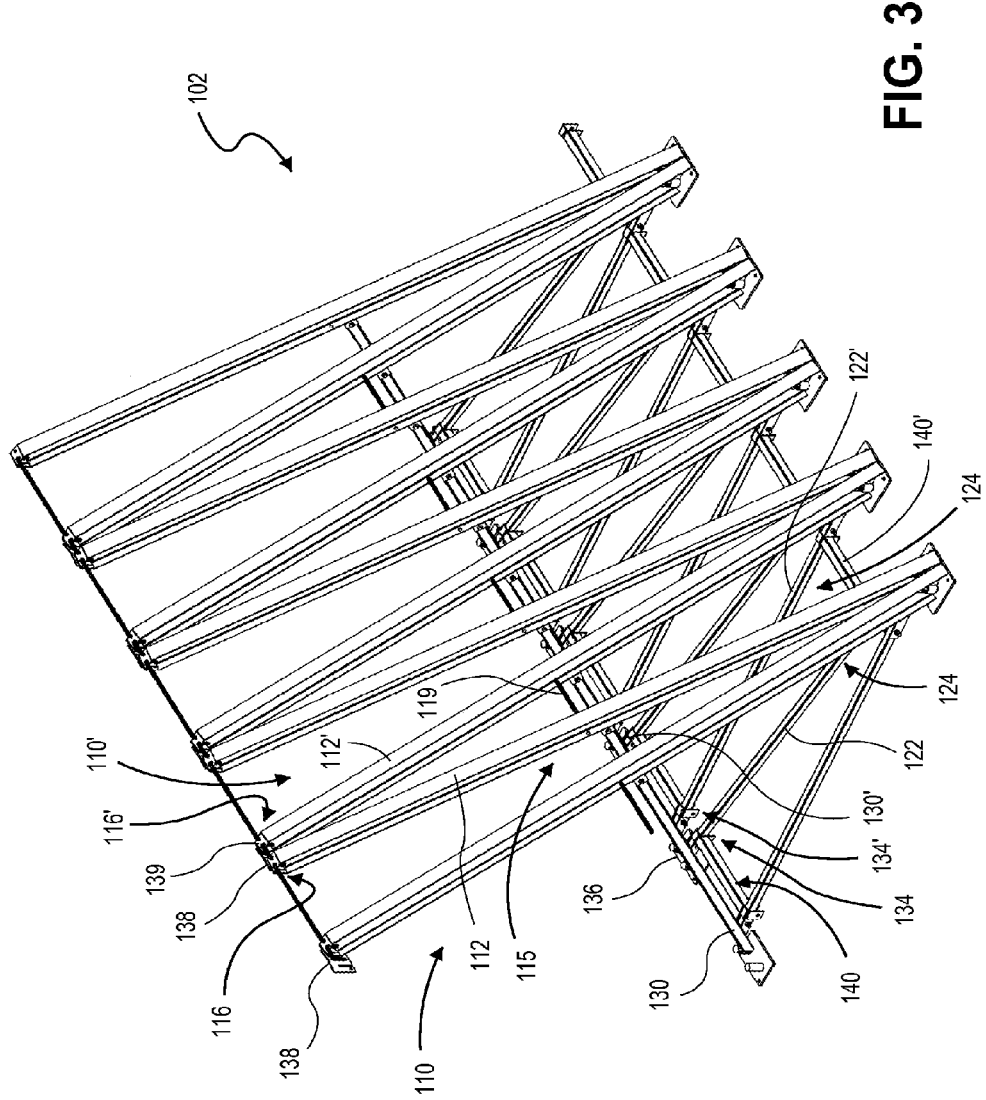
FIG. 3 illustrates an exemplary arrangement of straight strut assemblies.

Referring now to FIG. 3, an exemplary arrangement 102 of straight strut assemblies 110 is illustrated and described. The arrangement 102 includes a plurality of the V-shaped strut assemblies 110 coupled together to form an alternating "V" and "inverted V" pattern. The second ends 116, 116' of a pair of adjacent straight strut assemblies 110, 110' may be coupled together via a rear plate 138 (FIGS. 10A and 10B). The strut members 112, 112' of adjacent assemblies 110, 110' may be coupled to one another at an intermediate point 115 along their length by an intermediate coupling member 119 similar in structure to coupling member 118, but proportionately sized to span the distance between the two intermediate points 115 rather than the distance between the two second ends 116. It should be appreciated that other coupling members known to a person of ordinary skill in the art are contemplated by the disclosure. Optionally, an end coupling member 139 may couple the second ends 116, 116' of a pair of adjacent straight strut assemblies 110, 110'. The end coupling member 139 may be similar in structure to coupling members 118, 119, but proportionately sized to span the distance between the adjacent second ends 116, 116'. It should be appreciated that other coupling members known to a person of ordinary skill in the art are contemplated by the disclosure.

As shown in FIG. 3, the second end 134 of the support member 130 (obstructed in FIG. 3) of a first straight strut assembly 110 may be coupled to the same rear base plate 136 as the second end 134' of the support member 130' of a second straight strut assembly 110'. The rear base plates 136 are spaced from one another substantially the same distance as the front base plates 120. Thus base members 122, 122' of adjacent strut assemblies 110, 110' may be coupled to one another proximate their first ends 124 by a front coupling 140'. Similar to rear coupling 140, front coupling 140' may comprise a bar 142' having angled receiving members 144', for example, channels, at each end of the bar 142'. The angled receiving members 144' are structured and arranged to receive the first ends 124 of the base members 122, 122' at substantially the same angle at which the base members 122, 122' diverge from one another. As shown in FIG. 3, the angled receiving members 144' may be placed above the base members 122, 122' relative to a ground surface. The angle receiving members 144' may include an optional opening on each side of the base member 122, 122' to receive a coupling member (not shown), such as for example, a pin, a bolt, or the like, to prevent the rear coupling from inadvertently dislodging from the base members 122, 122' during assembly.

Figure 4:
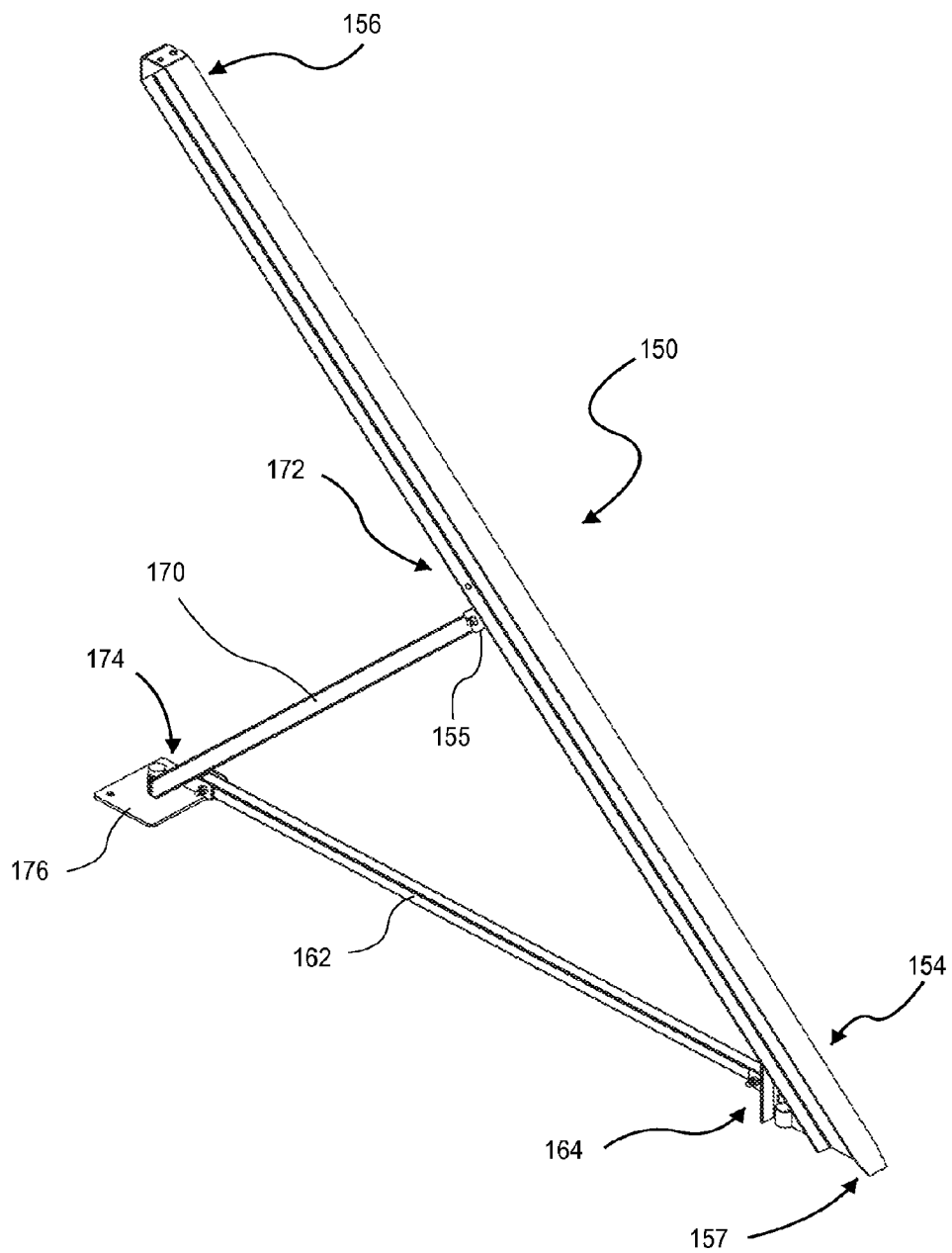
FIG. 4 illustrates an exemplary embodiment of a corner strut assembly in accordance with various aspects of the disclosure.

Referring now to FIG. 4, an exemplary corner strut assembly 150 is illustrated and described. The corner strut assembly 150 may include a strut member 152. According to various aspects, the strut member 152 may be a beam similar to the strut members 112 of the straight strut assembly 110. The strut member 152 may have a first end 154 configured to be coupled with a front base plate and a free second end 156. The first end 154 may include a tapered region 157 to accommodate the close abutment of adjacent corner strut assemblies 150 required to achieve, for example, a 22.5 degree turn at a desired turning radius. The corner strut assembly 150 may include a base member 162 and a support member 170. The base member 162 has a first end 164 pivotally coupled with the strut member 152 near the first end 154 thereof. The support member 170 has a first end 172 pivotally coupled with the strut member 152 at a joint 155 intermediate the first and second ends 154, 156. A second end 174 of the support member 170 may be coupled with a rear base plate 176, and a second end 166 of the base member 162 may be coupled with the support member 170 proximate the second end 174 thereof.

Figure 5:
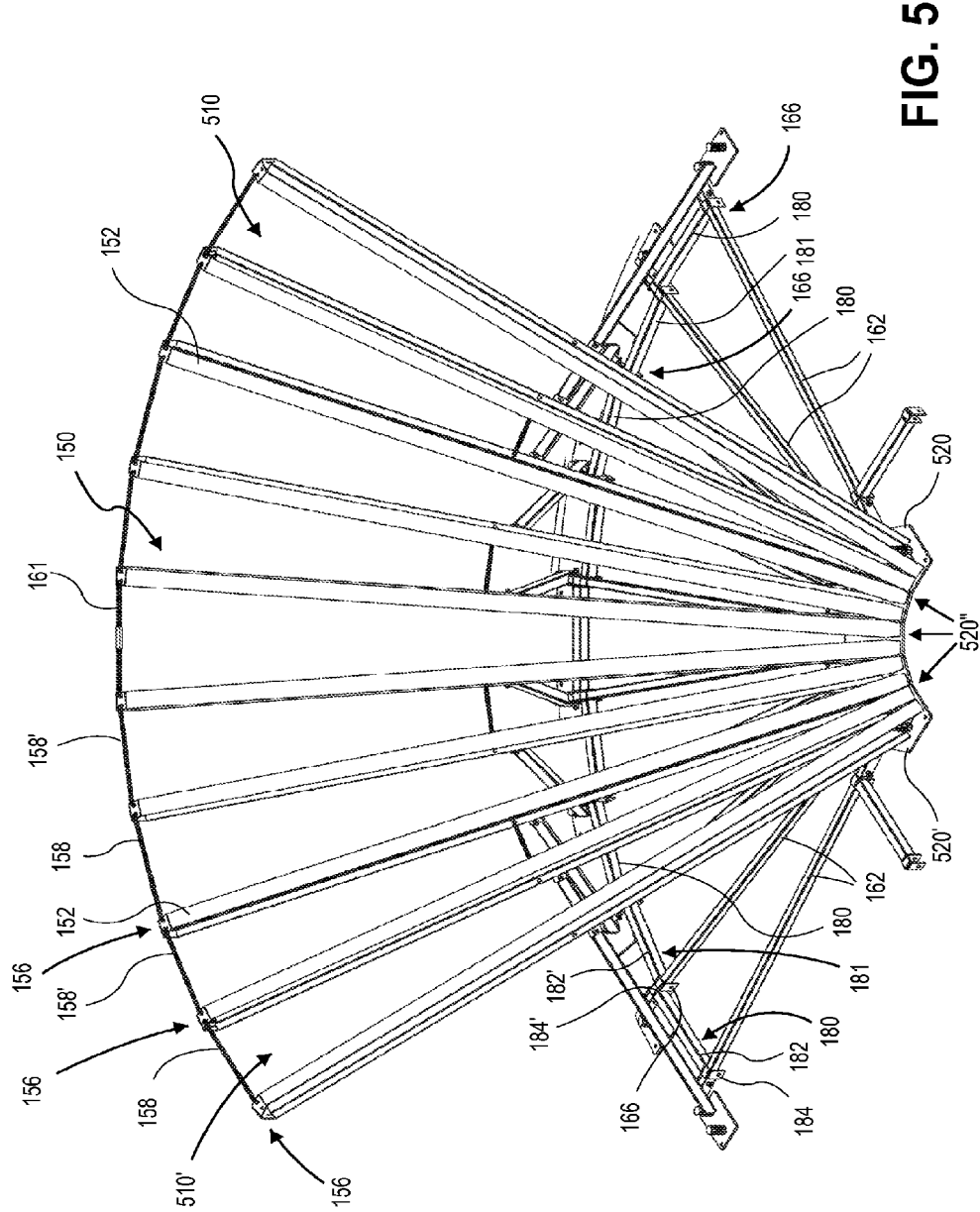
FIG. 5 illustrates an exemplary arrangement of corner strut assemblies.
Figure 6:
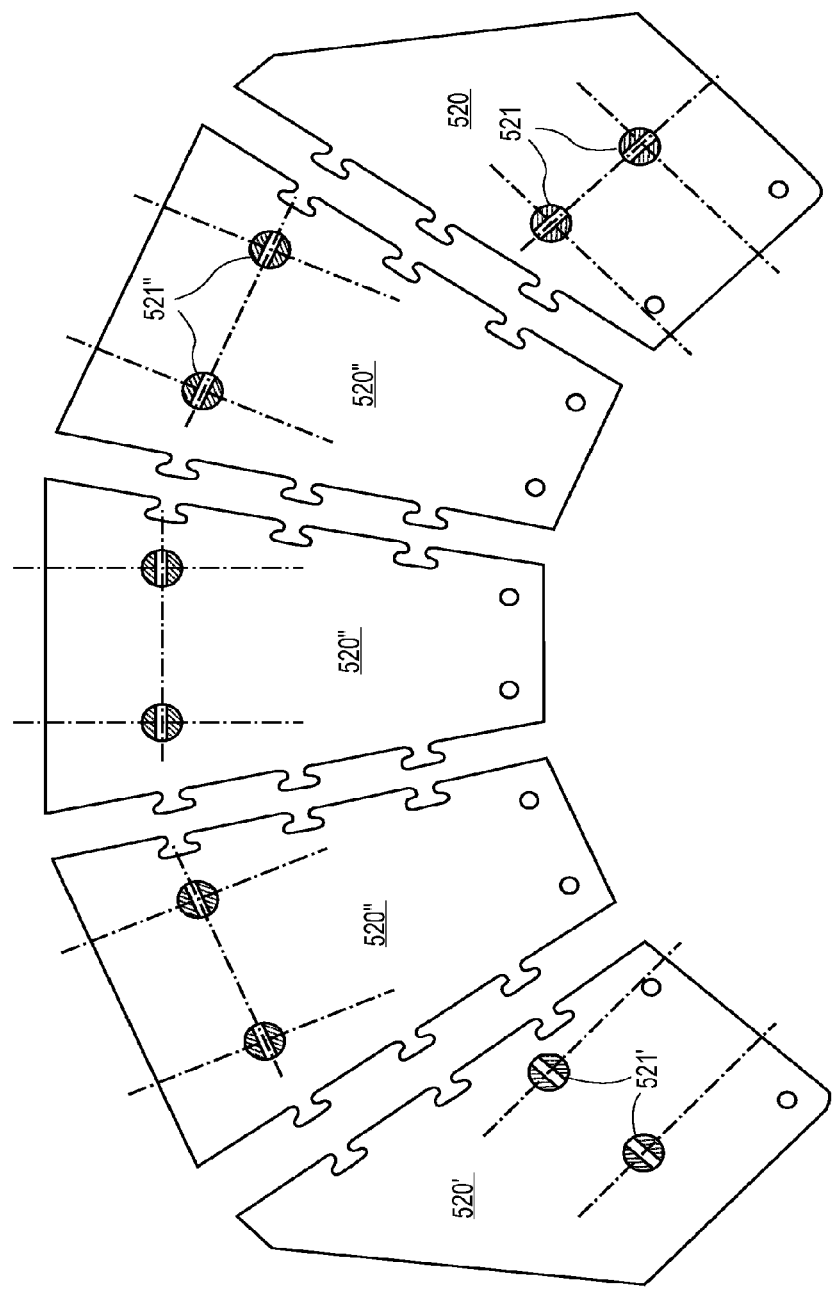
FIG. 6 illustrates an exploded view of a corner base plate assembly in accordance with various aspects of the disclosure.

Referring now to FIGS. 5, 6, and 11, an exemplary arrangement 104 of corner strut assemblies 150 is illustrated and described. The arrangement 104 includes a plurality of curved strut assemblies 150 coupled together between a pair of straight strut assemblies 510, 510'. For example, as shown in FIG. 5, the two rightmost strut members 112 comprise a V-shaped straight strut assembly 510 similar to the straight strut assembly 110 described above in connection with FIG. 2. Similarly, the two leftmost strut members 112 comprise a V-shaped straight strut assembly 510' similar to the straight strut assembly 110 described above in connection with FIG. 2. However, the straight strut assemblies 510, 510' may be coupled with a right front base plate 520 and a left front base plate 520', each base plate having two pins 521 and 521', respectively.

Each of the corner strut assemblies 150 is connected to a center front base plate 520". In the exemplary embodiment of FIGS. 5 and 6, the arrangement 104 includes six corner strut assemblies 150. Although FIGS. 5 and 6 illustrate three center front base plates 520" having two pins 521" for coupling two corner strut assemblies 150, it should be appreciated that the center front base plates 520" may include one pin or more than two pins, depending on the desired corner configuration.

As shown in FIG. 5, adjacent ones of the free second ends 156 of the corner strut assemblies 150 may be connected to one another via coupling members 158, 158'. The length of the coupling members 158, 158' may vary depending on the desired corner configuration. In the illustrated exemplary embodiment, every other adjacent pair of second ends 156 may include a coupling member 158 sized substantially similar to coupling member 118. The intervening coupling members 158' may be sized similar to one another but different than, for example, shorter than, the coupling members 158. Two free second ends 156' of the arrangement 104, for example, the centermost free ends in some aspects, may be coupled with an adjustable connecting member 161. For example, the adjustable connecting member 161 may be a turnbuckle-type connecting member as shown in FIG. 11. The adjustable connecting member 161 may facilitate proper curvature and configuration of the system 100.

In some aspects of the arrangement 104, the base members 162 of adjacent straight and corner strut assemblies 110, 150 that are coupled to the same front base plates 520, 520', 520" may be coupled to one another proximate their second ends 166 by a rear coupling 180. The rear coupling 180 may comprise a bar 182 having angled receiving members 184, for example, channels, at each end of the bar 182. The angled receiving members 184 are structured and arranged to receive the second ends 166 of the base members 162 at substantially the same angle at which the base members 162 diverge from one another. As shown in FIG. 2, the angled receiving members 184 may be placed above the base members 162 relative to a ground surface and radially inward relative to the base members 162.

In some aspects of the arrangement 104, the base members 162 of adjacent straight and/or corner strut assemblies 110, 150 that are not coupled to the same front base plates 520, 520', 520" may be coupled to one another proximate their second ends 166 by a rear coupling 181. The rear coupling 181 may comprise a bar 182' having angled receiving members 184', for example, channels, at each end of the bar 182'. The angled receiving members 184' are structured and arranged to receive the second ends 166 of the base members 162 at substantially the same angle at which the base members 162 diverge from one another. As shown in FIG. 2, the angled receiving members 184' may be placed above the base members 162 relative to a ground surface and radially inward relative to the base members 162. The angle receiving members 184, 184' may include an optional opening on each side of the base member 162 to receive a coupling member (not shown), such as for example, a pin, a bolt, or the like, to prevent the rear coupling from inadvertently dislodging from the base members 162 during assembly.

In some aspects, adjacent strut members 152 that are not coupled to the same center front base plates 520" may be coupled to one another at an intermediate point 165 along their length by an intermediate coupling member 159 similar in structure to coupling member 158, but proportionately sized to span the distance between the two intermediate points 155 rather than the distance between the two second ends 156. It should be appreciated that other coupling members known to a person of ordinary skill in the art are contemplated by the disclosure.

From the foregoing, it will be appreciated that, although specific embodiments have been described herein for purposes of illustration, various modifications or variations may be made without deviating from the spirit or scope of inventive features claimed herein. Other embodiments will be apparent to those skilled in the art from consideration of the specification and figures and practice of the arrangements disclosed herein. It is intended that the specification and disclosed examples be considered as exemplary only, with a true inventive scope and spirit being indicated by the following claims and their equivalents.

The invention claimed is:

1. A portable reservoir water containment apparatus comprising:
   a) a straight strut arrangement comprising
      a plurality of straight strut assemblies,
         each straight strut assembly including
            a plurality of inner base plates
               that enable interface of each straight strut assembly with a ground surface,
            a plurality of upper inclined beams,
               each upper inclined beam having
                  a lower surface that is attached to and bears upon said inner base plate,
            a plurality of outer base plates,
            intermediate beams that
               each extend between
               an outer base plate and
               an inclined beam,
            each intermediate beam
               connecting to the inclined beam
                  at a position in between the ends of the inclined beam,
            the inclined beams forming
               an alternating v-shaped and inverted v-shaped pattern defining a first plate;
   b) each straight strut assembly including
      lower beams that extend
         from a position next to the inner base plates to a position next to the outer base plates;
   c) a curved strut arrangement comprising
      a plurality of corner strut assemblies
         forming a desired curvature and
         connecting two straight strut arrangements to form a closed loop water containment system;

d) lateral braces
  that maintain lateral spacing between the inclined beams; and
e) wherein there are a plurality of lateral spacing base plate connectors
  that define the spacing between each pair of said outer base plates; and
f) wherein said lateral spacing base plate connectors
  are connectable to at least a plurality of the outer base plates before there has been a connection of any inclined members to the outer base plates.

2. A temporary liquid reservoir apparatus, comprising:
a) a frame structure that supports a flexible liner to contain a body of water on a ground surface, the frame structure having
  a top,
  a bottom,
  multiple sides and
  multiple corners
that surround the ground surface,
b) the frame structure including
  multiple pluralities of straight frame structures
    defining the plurality of sides, and
  multiple pluralities of curved frame structures
    defining the corners,
wherein the liner extends
  down from the top and
  over the enclosed ground surface;
c) each straight and curved frame structure including
  at least one inclined beam
    being removably connectable to at least one other inclined beam and
    to laterally extending connectors
      that maintain lateral spacing between
        the straight and curved frame structures;
d) each straight frame structure including
  a plurality of upper inclined beam members
    that form a pattern of alternating V and inverted V shapes
      to define an upper plane, and
  a plurality of lower beam members
    that form a pattern of alternating V and inverted V shapes
      to define a lower plane below said upper plane;
e) a plurality of base plates
  that are adapted to support the bottom of the inclined beam members on a supporting surface,
  the base plates including
    a plurality of inner base plates and
    a plurality of outer base plates;
f) diagonal supports that span between
  one of the outer base plates and
  one of the upper inclined beam members;
g) each inner base plate
  supporting two of said upper inclined beam members;
h) projections and socket connections
  that join each upper inclined beam member to one of the inner base plates;
i) the lateral connectors including
  lower connectors
    that each span between two adjacent of the outer base plates,
    the connector having
      end portions
        that each connect with a projection of one of the outer base plates; and
j) wherein the lower plane below said upper plane forms an acute angle.

3. The temporary liquid reservoir apparatus of claim 2, wherein each connector has slotted end portions, each slotted end portion being receptive of one of the projections.

4. The temporary liquid reservoir apparatus of claim 2, further comprising an upper connector that connects between two adjacent beams at upper end portions of the beams.

5. The temporary liquid reservoir apparatus of claim 2, wherein a pair of the upper, inclined beams forms one of the V-shaped patterns wherein said upper, inclined beams form an angle of between 10 and 90 degrees.

6. The temporary liquid reservoir apparatus of claim 2, wherein the laterally extending connectors include outer, lower connectors that each span between a pair of said outer base plates.

7. The temporary liquid reservoir apparatus of claim 2, in which each of the base plates comprises a flat planar base support member and attachment bracket for connecting between one of the beams and one of the base plates.

8. The temporary liquid reservoir apparatus of claim 2, in which the base plates have at least two spaced apart projections disposed therein for connection to a beam.

9. A temporary liquid reservoir comprising:
a) a plurality of frame structures
  supporting a flexible web liner,
each of said frame structures including
  a first plurality of beams
    that are inclined and
    that define a first alternating v-shaped and inverted v-shaped pattern, and
  a second plurality of beams
    that define a second alternating v-shaped and inverted v-shaped pattern having
      a smaller inclination
      than said first plurality of beams,
  at least one brace beam, and
  multiple front and rear feet;
b) said first plurality of beams and the second plurality of beams
  being removably connectable to the at least one brace beam in an erected position to form said frame structure,
said brace beam and said second plurality of beams of said erected frame structure
lying in a common transverse plane,
c) each foot connected to a bottom of said frame structure, said feet being adapted for connection
  at a position along said bottom of said frame structure,
  each said foot
    being adapted to support said frame structure on a supporting surface;
d) wherein the first and second pluralities of beams define first and second planes that form an acute angle; and
e) wherein the second plurality of beams each connect to both a said rear foot and the lower end portion of said first plurality of beams.

10. The temporary liquid reservoir of claim 9, in which at least some of said feet are flat planar base support members with an attachment bracket for connecting to an inclined beam.

11. The temporary liquid reservoir of claim 10, in which at least some of said feet have at least one projection therein for receiving an anchoring member.

* * * * *